United States Patent [19]

Shirodkar

[11] Patent Number: 4,957,969

[45] Date of Patent: * Sep. 18, 1990

[54] IMPROVED BLENDS OF LINEAR LOW DENSITY ETHYLENE COPOLYMERS

[75] Inventor: Pradeep P. Shirodkar, Somerset, N.J.

[73] Assignee: Mobil Oil Corporation, New York, N.Y.

[*] Notice: The portion of the term of this patent subsequent to March 21, 2006 has been disclaimed.

[21] Appl. No.: 295,430

[22] Filed: Jan. 10, 1989

[51] Int. Cl.$^5$ .................. C08L 23/18; C08L 55/02; C08L 23/08
[52] U.S. Cl. .................................. 525/86; 525/233
[58] Field of Search .............................. 525/233, 86

[56] References Cited

U.S. PATENT DOCUMENTS 4,430,476 2/1984 Liu .
4,814,385 3/1989 Dobreski et al. .................. 525/233

FOREIGN PATENT DOCUMENTS 63726 6/1978 Romania .

OTHER PUBLICATIONS

Kirk-Othmer, Encyclopedia of Chemical Technology, 3rd Ed., vol. 1, Wiley-Interscience 1981, pp. 442 to 445.
Hawley, Condensed Chemical Dictionary, 10th Ed., Van Nostrand Reinhold, 1981, p. 3.

*Primary Examiner*—Carman J. Seccuro
*Attorney, Agent, or Firm*—Alexander J. McKillop; Charles J. Speciale; Jessica M. Sinnott

[57] ABSTRACT

Novel polymer blends are provided comprising a major amount of a linear low density copolymer of ethylene with an olefin containing 4 to 10 carbon atoms (LLDPE) compounded with a minor amount of an ABS resin, based on the total polymer content of the blend. The blends can be fabricated with better processability into blown films having improved antiblocking, impact, and MD tear resistance properties.

19 Claims, No Drawings

IMPROVED BLENDS OF LINEAR LOW DENSITY ETHYLENE COPOLYMERS

BACKGROUND OF THE INVENTION

1. Field of the Invention

This invention relates to novel compositions comprising a linear low density copolymer of ethylene and a minor amount of an olefin containing 4 to 10 carbon atoms (LLDPE), and to films of improved properties formed from such compositions. Also included in the invention is the process of forming blown films from such compositions which is accomplished with improved processability and less blocking.

2. Description of Related Art

The following information is disclosed in accordance with the terms of 37 CFR 1.56, 1.97 and 1.98.

U.S. Pat. No. 4,430,476, issued Feb. 7, 1984 to Liu, discloses the improvement of the impact resistance and ductibility of notched polycarbonate resin articles by blending the polycarbonate with varying amounts of an alkenyl aromatic copolymer, e.g., an ABS resin, and an LLDPE.

Romanian Patent No. 63,726 of Petraru et al., published Jun. 30, 1978 [abstracted in C.A. 91(24)194203r] discloses blends of 100 parts of low density polyethylene, 2 to 20 parts of ABS copolymer, and 10 to 15 parts of carbon black extruded into films with transverse and longitudinal tensile strengths of 160 and 151 kg/cm$^2$, tear strength of 86 and 84 kg/cm$^2$, and breaking elongations of 640 and 660% respectively.

Kirk-Othmer, *Encyclopedia of Chemical Technology*, Third Edition, Vol. 1., Wiley-Interscience, 1981, pages 442 to 445, and Hawley, *Condensed Chemical Dictionary*, Tenth Edition, Van Nostrand Reinhold, 1981, page 3, describe typical ABS resins contemplated under this invention.

SUMMARY OF THE INVENTION

In accordance with this invention, novel polymer blends are provided comprising a major amount of a linear low density copolymer of ethylene with an olefin containing 4 to 10 carbon atoms (LLDPE), compounded with a minor amount of an "ABS resin" as the latter term is understood in the art and as defined hereinafter, based on the total polymer content of the blend. The blends can be fabricated with better processability into blown films having improved antiblocking, impact, and MD tear resistance properties.

DESCRIPTION OF PREFERRED EMBODIMENTS

The linear low density ethylene copolymers (LLDPE) of this invention are linear copolymers of ethylene and a minor amount, preferably about 2 to 10 wt. %, of an olefin, preferably a 1-olefin, containing 4 to 10 carbon atoms and having a density of about 0.9 to 0.94, a melting point of about 110° to 130° C., and a melt index of about 0.2 to 10. The preferred olefin comonomers are 1-butene, 1-hexene and 1-octene. The LLDPE may be prepared by any of various methods known in the art, e.g., by relatively low pressure methods as disclosed, for example, in U.S. Pat. No. 4,076,698, or by relatively high pressure methods, as disclosed, for example, U.S. Pat. Nos. 4,405,774 and 4,530,983.

The "ABS resin" contemplated under this invention comprises a rubbery or elastomeric butadiene polymer dispersed in a rigid or glassy styrene-acrylonitrile copolymer matrix. Preferably, the rubbery butadiene polymer contains, at various points along its backbone, grafted segments of styrene-acrylonitrile copolymer, which have the effect of improving compatability between the two polymer phases. Also contemplated within the term "ABS resin" are physical of a rubbery butadiene polymer containing no grafted polymer segments dispersed in a rigid styrene-acrylonitrile copolymer phase. Generally there is some degree of cross-linking within the rubbery butadiene polymer phase.

The rubbery butadiene polymer independent of any grafted polymer segments which may be present, usually contains at least about 60 wt. % of polymerized butadiene. Some examples of these polymers are polybutadiene (a butadiene homopolymer), and copolymers of butadiene and acrylonitrile and/or styrene. The rubbery butadiene polymer may be present, for example, in an amount of about 10 to 30 wt. % of the total polymer content of the ABS resin, and the overall amounts of polymerized acrylonitrile, butadiene, and styrene in the ABS resin are within the weight percent ranges of about 15–25:5–45:80–30, respectively, preferably about 15–22-:7–40:78–38.

The ABS resins contemplated under the invention may have, for example, a 3.2 mm notched Izod impact strength at 23° C. of about 2 to 12 ft-lb/in (ASTM D256), a tensile strength at 23° C. of about 4800 to 7500 psi (ASTM D638), a tensile modulus at 23° C. of about 2.5 to 3.8 × 10$^5$ psi (ASTM D638), a Rockwell hardness at 23° C. of about 88 to 110 HRC (ASTM D785), a specific gravity at 23° C. of about 1.02 to 1.06 (ASTM D792), a thermal deflection temperature of annealed samples at 264 psi of about 93° to 112° C (ASTM D648), and a linear coefficient of thermal expansion of 6.5 to 11.0×10$^{-5}$ cm/cm/° C. (ASTM D696). Some suitable ABS resins for use in the compositions and processes of this invention are described in the previously cited Kirk-Orthmer and Hawley references, the entire disclosures of which are incorporated by reference.

The blends of LLDPE and ABS resin may be prepared using any of various methods known in the art. For example, pellets of the two polymers may be dry blended and the blend added directly to a blown film extruder, e.g., a Sterling extruder, to produce films having a thickness, for example, of about 0.5 to 5 mils.

The polymer blends of this invention contain a major amount, i.e., over 50 wt. % of the LLDPE and a minor amount, i.e., under 50 wt. % of the ABS resin based on the total polymer content. Preferably, the blend contains about 1 to 25 wt. %, more preferably, about 2 to 10 wt. % of ABS resin, based on the total polymer content. Moreover, the polymer content of the blend preferably consists of the LLDPE and ABS resin. In addition to the polymer components, the blend may also contain any of various additives conventionally added to polymer compositions for different purposes, e.g. lubricants such as microtalc, stabilizers, compatibilizers, pigments, etc.

The following examples further illustrate the invention.

COMPARATIVE EXAMPLES A TO D AND EXAMPLES 1 AND 2

Films of 1.0 and 1.5 mils nominal gauge thickness were prepared from Mobil NTA-101 LLDPE, which is a linear low density copolymer of ethylene and about 6 wt. % of 1-hexene having a density of about 0.918, a melting point of about 125° C. and a melt index of about 1, in the absence of any other polymer or antiblocking agent (Comparative Examples A and B), the foregoing Mobil NTA-101 blended with 5000 ppm of microtalc as an antiblocking agent (Comparative Examples B and C), and the foregoing Mobil NTA-101 blended with 5 wt. % of Cycolac DFA-R1000 medium impact ABS resin manufactured by Borg-Warner Chemicals, Inc. and containing 20 wt. % of acrylonitrile, 10 wt. % of butadiene, and 70 wt. % of styrene, as determined by $^{13}C$ NMR. The ABS resin also had a notched Izod impact strength at 23° C. of about 4.0 ft-lb/in, a tensile strength at 23° C. of about 6,200 psi, a tensile modulus at 23° C. of about $3.4 \times 10^5$ psi, a Rockwell hardness at 23° C. of about 108 HRC, a specific gravity at 23° C. of about 1.04, a thermal deflection temperature of annealed samples at 264 psi of about 94° C., and a linear coefficient of thermal expansion of about $8.8 \times 10^5$ cm/cm/° C., using the ASTM test methods identified previously. The polymer blends of Examples 1 and 2 were prepared by dry blending the pellets, and the wt. % of ABS resin in these blends was based on the combined weight of the two polymers.

The films were made in a 2½ inch Sterling blown film extruder under the following fabrication conditions: BUR (blow up ratio) of 2.5, production rate of 150 lb/hr, die gap of 80 mils, and a 6 inch die.

The table shows the RPM, screw tip pressure and screw amperes at which the extruder operated, and the Induced Blocking Force (ASTM D3354), MD tear (ASTM D1922), Spencer Impact (ASTM D3420), and Dart Drop $F_{50}$ Impact (ASTM D1709), of the films prepared in the various examples.

TABLE

| Example | RPM | Screw Tip Press. psig | Screw Amperes | Nominal Gauge mils | Induced Blocking gms | MD Tear g/mils | Spencer Impact gms/mil | Dart Drop $F_{50}$ gms |
|---|---|---|---|---|---|---|---|---|
| A | 67.3 | 3050 | 45 | 1.0 | 131.7 | 374 | 853 | 234 |
| B | 67.3 | 3050 | 45 | 1.5 | 144.2 | 411 | 627 | 352 |
| C | 67.4 | 3090 | 46 | 1.0 | 85.1 | 335 | 763 | 175 |
| D | 67.4 | 3090 | 46 | 1.5 | 76.6 | 388 | 633 | 238 |
| 1 | 72.5 | 2810 | 42 | 1.0 | 74.5 | 435 | 1860 | 336 |
| 2 | 72.5 | 2810 | 42 | 1.5 | 84.9 | 487 | 1340 | 404 |

The results shown in the table indicate that improved MD Tear, Spencer Impact, and Dart Drop Impact properties were obtained with the films of Examples 1 and 2 prepared from blends of LLDPE with 5% of an ABS resin under the invention, as compared with the films of equal thickness of Comparative Examples A to B prepared from the same LLDPE not containing any resin or antiblocking agent, or with the films of comparative Examples C and D containing 5000 ppm of microtalc as an antiblocking agent. Moreover, the 1 mil thickness film of Example 1 under the invention had better antiblocking properties than the 1 mil thickness films of comparative Examples A and C and the 1.5 mil thickness film of Example 2 under the invention had better antiblocking properties than the 1.5 mil thickness film of Comparative Example B. Furthermore, these improved properties were accompanied by a superiority of processability in producing the ABS containing films of Examples 1 and 2 as compared with the films of Comparative Examples A to D, indicated by lower values of screw tip pressure and screw amperes.

I claim:

1. A film-forming polymer blend comprising, as the polymeric components, at least 50 wt. % of a linear low density copolymer of ethylene with an olefin containing 4 to 10 carbon atoms, and about 1 to 25 wt. % in an amount to improve antiblocking properties of an ABS resin, based on the total polymer content of the blend.

2. The blend of claim 1 wherein said ethylene copolymer contains about 2 to 10 wt. % of said olefin in polymerized form.

3. The blend of claim 1 wherein said olefin is a 1-olefin.

4. The blend of claim 3 wherein said 1-olefin is 1-butene, 1-hexene, or 1-octene.

5. The blend of claim 1 wherein said ethylene copolymer has a density of about 0.9 to 0.94, a melting point of about 110° to 130° C., and a melt index of about 0.2 to 10.

6. The blend of claim 5 containing from about 2 to 10 wt. % of said ABS resin.

7. The blend of claim 1 in which the polymers present consist of said low density copolymer of ethylene and said ABS resin.

8. A film composed of the blend of claim 1.

9. A film composed of the blend of claim 4.

10. A film composed of the blend of claim 6.

11. A process of extruding the blend of claim 1 into a blown film.

12. A process of extruding the blend of claim 4 into a blown film.

13. A process of extruding the blend of claim 6 into a blown film.

14. In a film of the type containing at least 50 wt. % of a linear low density copolymer of ethylene with an olefin containing 4 to 10 carbon atoms and from 1 to 25 wt. % of an acrylonitrile copolymer the improvement comprising the use of an ABS acrylonitrile copolymer in an amount useful for improving the antiblocking properties of the film comprising a butadiene polymer dispersed in a matrix of a styrene-acrylonitrile copolymer.

15. The film of claim 14 wherein the ethylene copolymer contains about 2 10 wt. % of the olefin in polymerized form.

16. The film of claim 14 wherein the olefin is a 1-olefin.

17. The film of claim 16 wherein the 1-olefin is 1-butene, 1-hexene, or 1-octene.

18. The film of claim 14 wherein the ethylene copolymer has a density of about 0.9 to 0.94, a melting point of about 110° to 130° C., and a melt index of about 0.2 to 10.

19. The film of claim 14 containing from about 2 to 10 wt. % of ABS resin.

* * * * *